E. S. FISHER.
EDUCATIONAL TOYS.

No. 188,505.  Patented March 20, 1877.

WITNESSES
Frank G. Parker
A. Hun Berry

INVENTOR.
Edwin S. Fisher
pr William Edson Atty

UNITED STATES PATENT OFFICE.

EDWIN S. FISHER, OF BOSTON, MASSACHUSETTS.

IMPROVEMENT IN EDUCATIONAL TOYS.

Specification forming part of Letters Patent No. 188,505, dated March 20, 1877; application filed December 14, 1876.

*To all whom it may concern:*

Be it known that I, EDWIN S. FISHER, of Boston, in the county of Suffolk and State of Massachusetts, have invented a new and useful Improvement in Toy Money, of which the following is a specification:

The nature of my invention consists in a paper fac-simile of coin, to be used by children in play, for the double purpose of amusement and instruction.

Figure 1:
Figure 2:

Figure 1 is a drawing of a fifty-cent coin. Fig. 2 is a drawing of a five-cent coin.

I make the toy coins of thick paper, of the size proper to the coin represented, and have printed with ink on the sides letters, figures, and designs to correspond with those of the real coin.

As the toy coins are made of the same size and shape as the real ones, and are neat and cheap, they form a very attractive plaything.

This may be used as a part of the kindergarten school or by the children at home.

Any coin may be embraced in my invention—American or foreign.

Having now described the construction and operation of my invention, what I desire to secure is as follows:

As a new article of manufacture, the paper toy coin formed of card-board and printed upon with ink, substantially as described, and for the purpose set forth.

EDWIN S. FISHER.

Witnesses:
   NATHL. EVANS,
   CHARLES S. DREW.